(12) United States Patent
Park et al.

(10) Patent No.: US 7,151,142 B2
(45) Date of Patent: Dec. 19, 2006

(54) BIODEGRADABLE ALIPHATIC POLYESTER GRAFTED WITH POLY(ETHYLENE GLYCOL) HAVING REACTIVE GROUPS AND PREPARATION METHOD THEREOF

(75) Inventors: Jung Ki Park, Daejeon (KR); Seong-Nam Lee, Daejeon (KR); Shi-Joon Sung, Daejeon (KR); Ki-Yun Cho, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 351 days.

(21) Appl. No.: 10/875,533

(22) Filed: Jun. 25, 2004

(65) Prior Publication Data

US 2005/0065292 A1    Mar. 24, 2005

(30) Foreign Application Priority Data

Sep. 19, 2003  (KR) ................ 10-2003-0065269

(51) Int. Cl.
  *C08G 65/08*  (2006.01)
  *C08F 283/02*  (2006.01)
(52) U.S. Cl. .............. 525/411; 525/411; 525/412; 525/415; 525/531; 525/533; 528/354; 528/357; 528/359
(58) Field of Classification Search ........ 525/411, 525/408, 412, 415, 431, 533, 354; 528/357, 528/359
See application file for complete search history.

(56) References Cited

U.S. PATENT DOCUMENTS

| | | | |
|---|---|---|---|
| 3,645,986 A | | 2/1972 | Rifi |
| 5,494,977 A | * | 2/1996 | Harano et al. .............. 525/438 |
| 6,133,366 A | | 10/2000 | Thetford et al. |
| 6,221,977 B1 | * | 4/2001 | Park et al. .................. 525/408 |
| 6,730,772 B1 | * | 5/2004 | Shastri ....................... 528/354 |

OTHER PUBLICATIONS

Chen, X., et al., "Synthesis and Characterization of [L]-Lactide-Ethylene Oxide Multiblock Copolymers," *Macromolecules* 30:4295-4301, American Chemical Society (1997).

Cho, K.Y., et al., "Synthesis and characterization of poly(ethylene glycol) grafted poly(L-lactide)," *Macromol. Rapid Commun.* 20:598-601, Wiley-VCH (1999).

Choi, Y.K., et al., "Star-Shaped Poly(ether-ester) Block Copolymers: Synthesis, Characterization, and Their Physical Properties," *Macromolecules* 31:8766-8774, American Chemical Society (1998).

Jin, S. and Gonsalves, K.E., "Synthesis of poly(l-lactide-*co*-serine) and its graft copolymers with poly(ethylene glycol)," *Polymer* 39:5155-5162, Elsevier Science Ltd (1998).

* cited by examiner

*Primary Examiner*—Randy A Gulakowski
*Assistant Examiner*—Alicia M Toscano
(74) *Attorney, Agent, or Firm*—Sterne, Kessler, Goldstein & Fox P.L.L.C.

(57) ABSTRACT

The present invention is directed to a poly(ethylene glycol)-grafted aliphatic polyester represented by Formula 1:

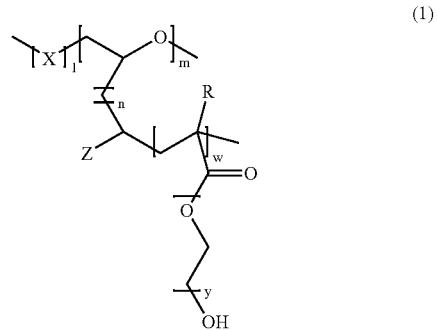

(1)

wherein X is an aliphatic ester, R is hydrogen or $C_{1-5}$ alkyl, Z is the binding moiety of an initiator or a chain transfer agent, m/l is from 0.1 to 50, n is from 2 to 50, w is 1 or greater, and y is from 1 to 200.

Further disclosed is a method for preparing the poly(ethylene glycol)-grafted aliphatic polyester of the present invention.

13 Claims, 2 Drawing Sheets

BIODEGRADABLE ALIPHATIC POLYESTER GRAFTED WITH POLY(ETHYLENE GLYCOL) HAVING REACTIVE GROUPS AND PREPARATION METHOD THEREOF

This application claims priority to Korean Patent Application No. 10-2003-0065269, filed Sep. 19, 2003, which is incorporated by reference herein in its entirety.

BACKGROUND OF THE INVENTION

1. Field of the Invention

The present invention relates to biodegradable aliphatic polyesters. In some embodiments, the biodegradable aliphatic polyester is grafted with poly(ethylene glycol) having reactive groups. In some embodiments, the biodegradable aliphatic polyester is applied to matrices for drug delivery systems and biochips.

2. Background Art

Aliphatic polyesters generally exhibit excellent biodegradability. For this reason, research on applications of aliphatic polyesters as medical polymers, such as matrices for drug delivery systems, scaffolds for tissue engineering, medical sutures and water-absorbing materials have been actively studied. Representative aliphatic polyesters used in various medical fields include polycaprolactone, polylactide and copolymers thereof. However, several disadvantages of aliphatic polyesters exist due to their high hydrophobicity and crystallinity. These disadvantages include adsorption of proteins to the polymer matrix, denaturation of proteins contained in the polymers, and local accumulation of acidic hydrolysates. Due to these disadvantages, extensive research has been undertaken to impart hydrophilicity to the aliphatic polyesters.

Aliphatic polyesters combined and copolymerized with hydrophilic materials such as poly(ethylene glycol), poly(vinyl alcohol) or heparin have been suggested. Among them, a copolymer with poly(ethylene glycol) has been widely studied. Block, star and graft copolymers in which hydrophobic chains are covalently bound with hydrophilic chains have been reported to exhibit peculiar dispersion characteristics in aqueous solutions. Additionally, these copolymers have shown improved protein stability and blood compatibility.

Various processes for synthesizing block copolymers have been proposed. For example, synthesis of a block copolymer can be carried out by ring-opening polymerization of a cyclic compound of an aliphatic ester (hereinafter, referred to as an "alicyclic ester compound") with a mono-alkoxy poly(ethylene glycol) in the presence of a ring-opening catalyst. Star-shaped copolymers can be prepared in a similar manner. Graft copolymers can typically be prepared by reacting mono-alkoxy poly(ethylene glycol) with epichlorohydrin (Williamson reaction) to synthesize epoxy poly(ethylene glycol) macromers. Copolymerization of epoxy poly(ethylene glycol) and alicyclic ester compounds occurs by a ring opening reaction.

Although modified aliphatic polyesters produced by the above methods exhibit improved hydrophilicity and reduced crystallinity, further modification is limited. The limitation is due to the difficulty to reacting the alkoxy groups at the end of the poly(ethylene glycol) chains with another functional group.

Most research on aliphatic polyesters grafted with hydroxyl group-terminated poly(ethylene glycol) has followed two approaches. In one approach, poly(ethylene glycol) methacrylate is added to a linear aliphatic polyester. The mixture is then subjected to reactive extrusion to produce a polymer having hydroxyl group-terminated grafted chains. Another approach is based on the modification of an alicyclic ester compound. A monomeric alicyclic ester compound, in which the hydroxyl group is blocked by a protecting group, is ring-opened in the presence of a catalyst. After the polymerization, the protecting group is removed and the hydroxyl group is reacted with a poly(ethylene glycol) derivative to produce an aliphatic polyester containing poly(ethylene glycol) having a hydroxyl group at the end of the chain.

Thus, the aliphatic polyesters have an advantage in terms of the functionality in hydroxyl groups at the terminals of the grafted poly(ethylene glycol) chains. However, the process has several drawbacks. For example, the backbone of the aliphatic polyester can be degraded during the reactive extrusion. As a result, the molecular weight of the polyester is reduced. Additionally, in the case of using modified monomer, it is difficult to increase the content of the poly(ethylene glycol) in the aliphatic polyester, since the graft ratio of poly(ethylene glycol) is dependent on the ratio of the modified monomer to the main chain.

BRIEF SUMMARY OF THE INVENTION

The present invention is directed to biodegradable aliphatic polyesters grafted with poly(ethylene glycol) having reactive groups, wherein the content of the poly(ethylene glycol) can be controlled within a desired range to satisfy diverse requirements without decreasing the molecular weight of the aliphatic polyester.

It is another object of the present invention to provide methods for preparing a biodegradable aliphatic polyester grafted with a poly(ethylene glycol) having reactive groups, wherein the content of the poly(ethylene glycol) can be controlled without decreasing the molecular weight of the aliphatic polyester.

BRIEF DESCRIPTION OF THE DRAWINGS/FIGURES

DETAILED DESCRIPTION OF THE INVENTION

Figure 1:
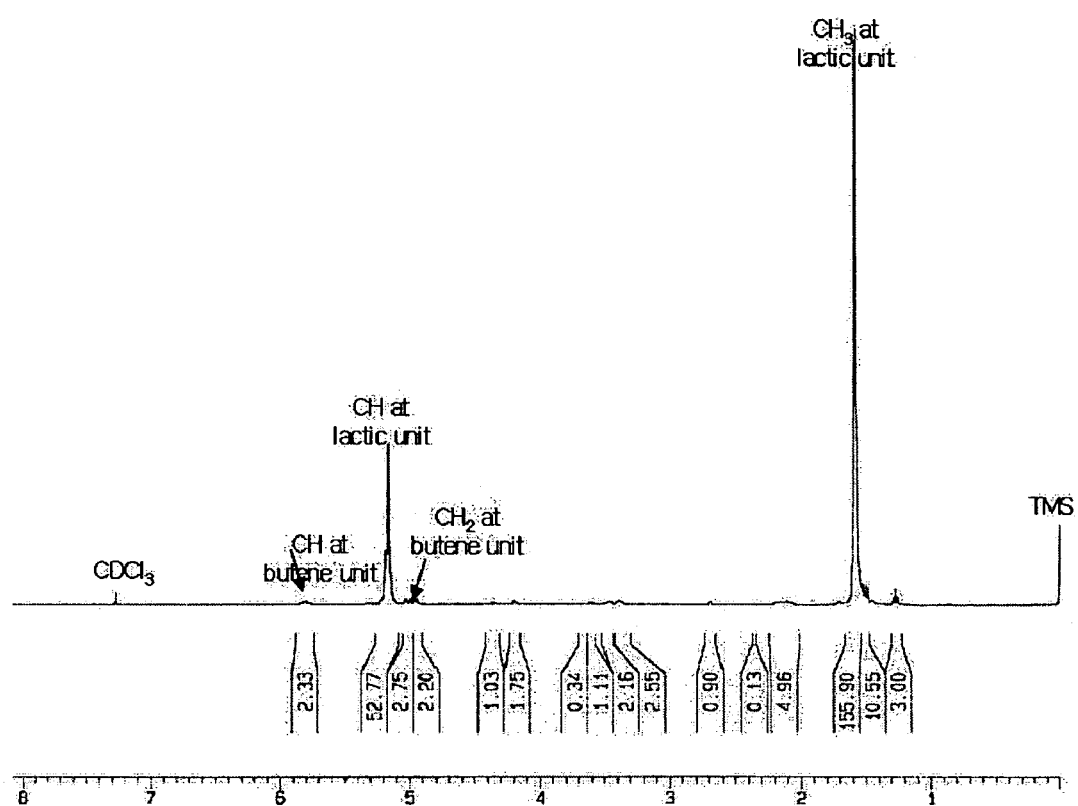
FIG. 1 is an analytical result of the $^1$H-NMR spectrum of a polymer prepared in Example 1 of the present invention.

Poly(ethylene glycol)-grafted aliphatic polyester of the invention is provided by Formula 1:

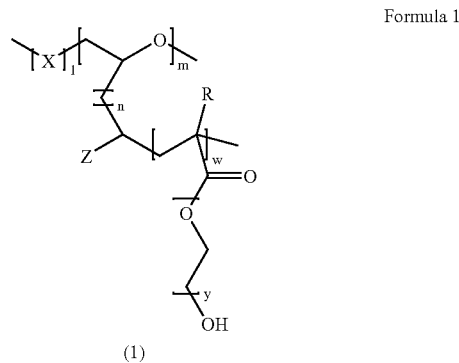

Formula 1

(1)

wherein X is a repeating unit of an aliphatic ester, R is hydrogen or $C_{1-5}$ alkyl, Z is the binding moiety of an initiator or a chain transfer agent, a ratio of m/l is from 0.1 to 50, n is from 2 to 50, w is 1 or greater and varies depending on the needs of a user, and y is from 1 to 200.

In some embodiments, X is a ring-opened alicyclic ester compound. In some embodiments, X is any monomer which is commonly used for the preparation of biodegradable aliphatic polyesters. Examples of monomers include, but are not limited to, lactide, glycolide, caprolactone, β-propiolactone, γ-butyrolactone and p-dioxanone.

The degree of polymerization of the alicyclic ester compound monomer is represented by 1. The degree of polymerization of the epoxy-based monomer is represented by m. In some embodiments, the ratio of m/l is not limited. In some embodiments, the ratio of m/l is from 0.1 to 50. When the m/l ratio is lower than 0.1, the number of double bonds is small, making further modification difficult. When the m/l ratio is higher than 50, characteristics inherent to the aliphatic polyester are undesirably lost.

The number of methylene (—$CH_2$—) repeating units is represented by n. In some embodiments, n is without limits. In some embodiments, n is from 2 to 50. When n exceeds 50, the macromer is not easily synthesized.

R represents hydrogen or $C_{1-5}$ alkyl. Examples of $C_{1-5}$ alkyl include, but are not limited to, methyl, ethyl, n-propyl, isopropyl, n-butyl, isobutyl, n-pentyl and isopentyl groups.

w can be any positive number, i.e., w is 1 or greater, and depends on the needs of the user. In some embodiments, w is a number from 1 to 200. The value of w can vary depending on the desired number of poly(ethylene glycol) chains having a required functional group (e.g., hydroxyl group).

The number of the oxyethylene group (—$CH_2CH_2O$—) is represented by y. The value of y determines the molecular weight of the poly(ethylene glycol) and can vary depending on the needs of a user. In some embodiments, y is a number from 1 to 200.

Z represents the binding moiety of an initiator or a chain transfer agent added for polymerization. For example, when 2,2'-azobisisobutyronitrile (AIBN) is used as an initiator, Z is $C_4H_6N_2$.

The average molecular weight of the aliphatic polyester of Formula 1 according to the present invention can vary according to the biodegradability and mechanical properties desired. In some embodiments, the molecular weight of the aliphatic polyester can be, but is not limited to, 2,000 to 500,000. When the average molecular weight is less than 2,000, there is a risk of drastic degradation of the oligomer to be synthesized and deterioration of the physical properties of the aliphatic polyester. On the other hand, when the average molecular weight exceeds 500,000, the biodegradability of the aliphatic polyester may be decreased considerably.

The present invention also provides a method for preparing a poly(ethylene glycol)-grafted aliphatic polyester, comprising: (a) subjecting an alicyclic ester compound and an epoxy-based monomer to ring-opening polymerization to obtain a macromer, wherein the epoxy-based monomer has one double bond at the terminal of the alkyl chain, and (b) radically polymerizing the macromer with a poly(ethylene glycol) having a radically polymerizable functional group.

In some embodiments, the alicyclic ester compound used in (a) can be a monomer selected from, but not limited to, lactide, glycolide, caprolactone, β-propiolactone, γ-butyrolactone and p-dioxanone.

In some embodiments, the content of the epoxy-based monomer can be, but is not limited to, 0.1 to 50 mole percent (mole %) based on the alicyclic ester compound.

In some embodiments, the alkyl group of the epoxy-based monomer used in (a) can be, but is not limited to, $C_{2-50}$ alkyl.

The poly(ethylene glycol) with functional groups used in (b) contains a vinyl group which enables radical polymerization with the epoxy-based monomer. In some embodiments, the poly(ethylene glycol) used in (b) is poly(ethylene glycol) acrylate or poly(ethylene glycol) methacrylate of which the average molecular weight is from 150 to 1,500.

A reaction catalyst which is usable for the ring-opening polymerization of (a) can be selected from, but is not limited to, $Sn(Oct)_2$, $Al(i-Bu)3.0.5H_2O$ and $AlEt_3.0.5H_2O$.

In some embodiments, (a) is performed at a reaction temperature between about 50° C. and about 150° C. When the reaction temperature is lower than about 50° C., the reaction rate can be too slow. Meanwhile, when the reaction temperature exceeds about 150° C., the monomers can be vaporized during the reaction.

Various solvents can be used in (a). In some embodiments, the solvent in (a) includes, but is not limited to, N,N-dimethylformamide, N,N-dimethylacetamide, dimethylsulfoxide, xylene, tetrahydrofuran, benzene, toluene, acetonitrile, dichloromethane, ethylacetate, butylacetate, 1,4-dioxane, chloroform and combinations thereof.

The polymerization of (b) can be carried out by the addition of common initiators which generate one or more radicals. In some embodiments, the initiator is selected from the group consisting of, but not limited to, azobisisobutyronitrile, benzoyl peroxide, acetyl peroxide, lauryl peroxide, tert-butyl peracetate, cumyl peroxide, tert-butyl peroxide, tert-butyl hydroperoxide, and combinations thereof.

Suitable reaction temperatures for the radical polymerization of (b) is from about 20° C. to about 150° C. When the polymerization is carried out at a temperature lower than about 20° C., the polymerization rate is too slow. On the other hand, when the polymerization is carried out at a temperature exceeding about 150° C., the double bonds contained in the macromer may be thermally deformed.

Examples of solvents which are usable for the graft polymerization in (b) include, but are not limited to, N,N-dimethylformamide, N,N-dimethylacetamide, dimethylsulfoxide, xylene, tetrahydrofuran, benzene, toluene, acetonitrile, dichloromethane, ethylacetate, butylacetate, 1,4-dioxane, chloroform, and combinations thereof.

As depicted in Reaction Scheme 1, the lactide of Formula 2 is used as an alicyclic ester compound and 1,2-epoxy-5-hexene of Formula 3 is used as an epoxy-based monomer having a double bond at the terminus of the alkyl chain. The lactide and 1,2-epoxy-5-hexene are completely dissolved in a suitable solvent and are then subjected to ring-opening polymerization to give the macromer of Formula 4.

Reaction Scheme 1

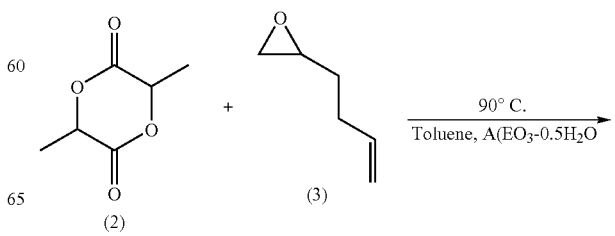

-continued

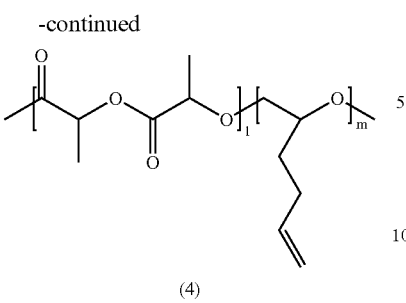

(4)

Thereafter, as depicted in Reaction Scheme 2, the macromer of Formula 4 and poly(ethylene glycol) methacrylate of Formula 5 are completely dissolved in a suitable solvent and then subjected to radical polymerization to give the poly(ethylene glycol)-grafted polylactide of Formula 6.

Reaction Scheme 2

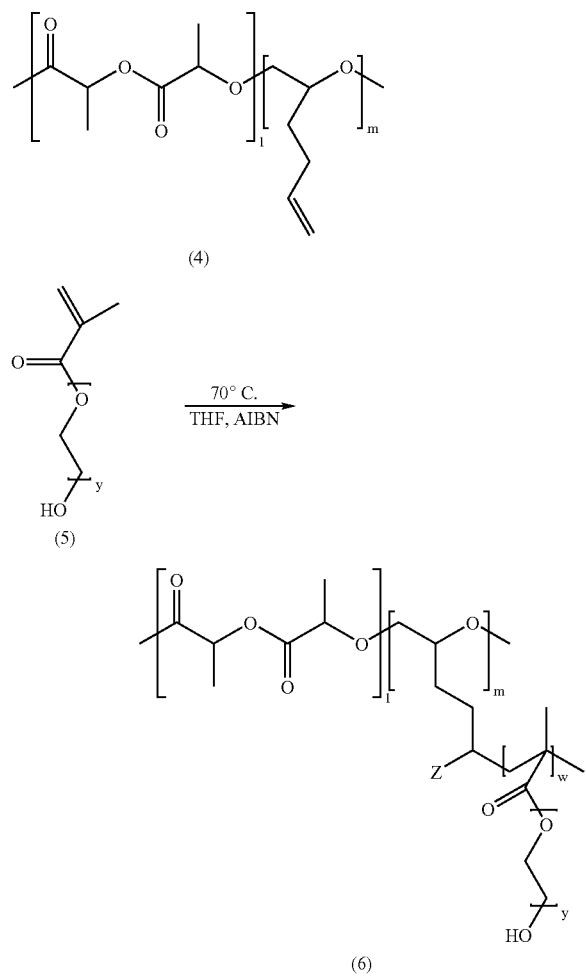

The raw materials used in the above reactions are provided for the illustrative purposes only and can be modified and altered by those skilled in the art within the scope of the present invention. Various raw materials belonging to equivalents are set forth below.

EXAMPLE 1

Preparation of Macromer by the Ring-Opening Copolymerization of Lactide and 1,2-epoxy-5-hexene A macromer (hereinafter referred to as "PLL-g-butene"), in which each alkyl chain grafted to a polylactide backbone has a double bond at its terminus, was prepared. 5.88 g of L-lactide and 4.12 g of 1,2-epoxy-5-hexene were charged into three 500 ml reflux flasks equipped with a nitrogen inlet in a glove box. 50 ml toluene was then added to each flask. After the resulting mixtures were completely dissolved and became transparent, 98.6 mg (1 mole % relative to the monomers) of $Al(Et)_3 \cdot 0.5H_2O$ was added to the solutions and the flasks were tightly sealed. The flasks were taken out of the glove box and placed in a 90° C. thermostatic oil bath equipped with a condenser under nitrogen atmosphere. After predetermined time intervals (12, 24 and 36 hours), the reaction products were precipitated in diethyl ether to obtain polymers. The polymers obtained were then washed with diethyl ether three times and dried in a vacuum oven for 1 day. The polymers were shown to have a double bond content of 7.0, 7.5 and 8.1 mole % (mole % relative to the moles of monomer unit at the main chain), respectively. Each of these polymers was in the form of a powder and was confirmed to be macromer having an average molecular weight of 10,000 (FIG. 1).

EXAMPLE 2

Preparation of Macromer by the Ring-Opening Copolymerization of Lactide and 1,2-epoxy-5-hexene A macromer was prepared in the manner of Example 1, except that $Sn(Oct)_2$ was used as a ring-opening polymerization catalyst instead of $Al(Et)_3 \cdot 0.5H_2O$ and the reaction time was set to 12 hours. The macromer was in the form of a powder and was confirmed to have an average molecular weight of 10,000.

EXAMPLE 3

Figure 2:
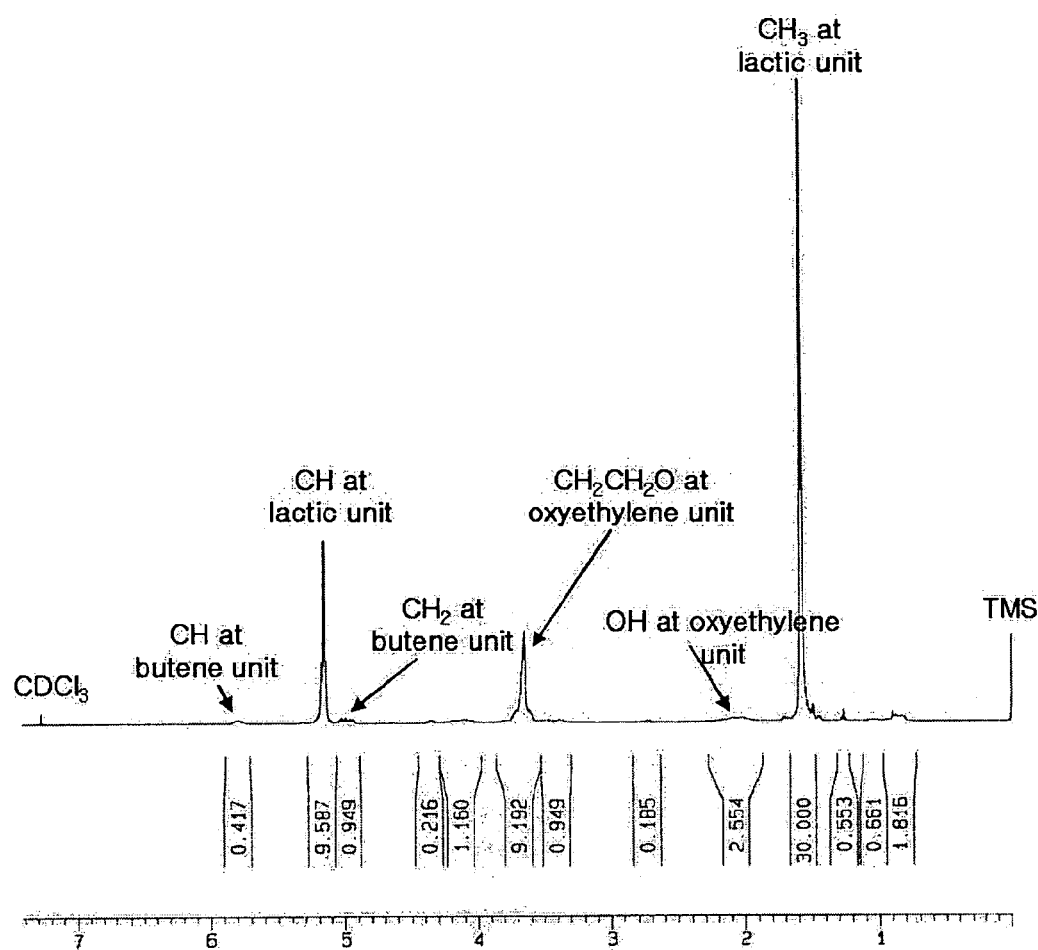
FIG. 2 is an analytical result of the $^1$H-NMR spectrum of a polymer prepared in Example 3 of the present invention.

Preparation of Polylactide Grafted with poly(ethylene glycol) Having Reactive Groups Mixtures of 1 g of PLL-g-butene (epoxy-based monomer: 8.1 mole %) prepared in Example 1 and 3.6 g of poly (ethylene glycol) methacrylate (average molecular weight: 360; hereinafter referred to as "PEGM") were charged into three 500 ml reflux flasks equipped with a nitrogen inlet in a glove box. 50 ml of tetrahydrofuran was then added to each flask. After the resulting mixtures were completely dissolved and became transparent, the flasks were tightly sealed and taken out of the glove box. The flasks were placed in a thermostatic bath equipped with a condenser under nitrogen atmosphere and heated to 70° C. At that temperature, predetermined amounts of AIBN (2.7 mg, 9 mg and 18 mg) were added to each flask. 25 hours after addition of AIBN, the reaction products were precipitated in methanol to obtain polymers. The polymers were washed with methanol three times and dried for 1 day. The polymers were shown to have a poly(ethylene glycol) content of 16.6, 18.4 and 7.0 mole % (mole % relative to the moles of monomer unit at the main chain) respectively (FIG. 2). The results are summarized in Table 1.

TABLE 1

| Macromer (1 g) | Graft ratio of butene (mole %) | PEGM (g) | Reaction time (hr) | AIBN (mg) | Graft ratio of PEG (mole %) |
|---|---|---|---|---|---|
| PLL-g-butene8.1 | 8.1 | 3.6 | 25 | 2.7 | 16.6 |
| PLL-g-butene8.1 | 8.1 | 3.6 | 25 | 9 | 18.4 |
| PLL-g-butene8.1 | 8.1 | 3.6 | 25 | 18 | 7.0 |

EXAMPLE 4

Preparation of Polylactide Grafted with poly(ethylene glycol) Having Reactive Groups Mixtures of 1 g of PLL-g-butene (epoxy-based monomer: 7.0 mole % and 7.5 mole %) prepared in Example 1 and 3.6 g of poly(ethylene glycol) methacrylate were charged into four 500 ml reflux flasks equipped with a nitrogen inlet in a glove box. 50 ml of tetrahydrofuran was then added to each flask. After the resulting mixtures were completely dissolved and became transparent, the flasks were tightly sealed and taken out of the glove box. The flasks were placed in a thermostatic bath equipped with a condenser under nitrogen atmosphere and heated to 70° C. At that temperature, predetermined amounts of AIBN (3 mg and 8 mg) were added to each flask. 48 hours after the addition of AIBN, the reaction products were precipitated in methanol to obtain the polymers. Then, the polymers were washed with methanol three times and dried for 1 day. The poly(ethylene glycol) content of the polymers was measured. The results are shown in Table 2 below.

TABLE 2

| Macromer (1 g) | Graft ratio of butene (mole %) | PEGM (g) | Reaction time (hr) | AIBN (mg) | Graft ratio of PEG (mole %) |
|---|---|---|---|---|---|
| PLL-g-butene7.0 | 7.0 | 3.6 | 48 | 8 | 9.5 |
| PLL-g-butene7.5 | 7.5 | 3.6 | 48 | 8 | 19.5 |
| PLL-g-butene7.0 | 7.0 | 3.6 | 48 | 3 | 10 |
| PLL-g-butene7.5 | 7.5 | 3.6 | 48 | 3 | 15 |

The poly(ethylene glycol)-grafted aliphatic polyesters of present invention can be applied to various matrices for drug delivery systems and biochips via covalent bonds between the polymer and ligands or drugs, since the biodegradable aliphatic polyester polymer of the present invention contains a poly(ethylene glycol) having reactive groups. The methods for preparing the biodegradable aliphatic polyester of the present invention can provide novel polymers capable of satisfying various requirements, since the content of a poly (ethylene glycol) having a functional group can be easily controlled within a desired range by varying reaction conditions such as the content of a polymerizable functional group and the content of an initiator used for radical polymerization, etc.

These examples illustrate possible embodiments of the present invention. While the invention has been particularly shown and described with reference to some embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A poly(ethylene glycol)-grafted aliphatic polyester represented by Formula 1:

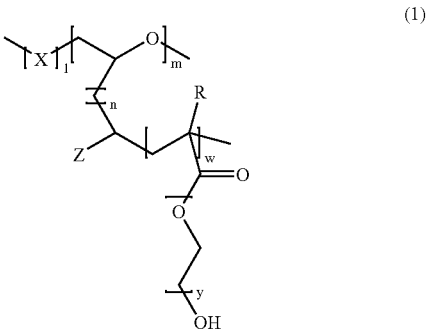

wherein X is an aliphatic ester, R is hydrogen or $C_{1-5}$ alkyl, Z is the binding moiety of an initiator or a chain transfer agent, a ratio of m/l is from 0.1–50, n is from 2 to 50, w is 1 or greater, and y is from 1 to 200.

2. The aliphatic polyester of claim 1, wherein X is a monomer selected from lactide, glycolide, caprolactone, β-propiolactone, γ-butyrolactone and p-dioxanone.

3. The aliphatic polyester of claim 1, wherein w is from 1 to 200.

4. A method for preparing a poly(ethylene glycol)-grafted aliphatic polyester, comprising:
   (a) subjecting an alicyclic ester compound and an epoxy-based monomer having an alkyl chain to ring-opening polymerization to obtain a macromer, wherein the epoxy-based monomer has one double bond at a terminal end of the alkyl chain; and
   (b) polymerizing the macromer with a poly(ethylene glycol) having a radically polymerizable functional group.

5. The method of claim 4, wherein the alicyclic ester compound in (a) is a monomer selected from lactide, glycolide, caprolactone, β-propiolactone, γ-butyrolactone and p-dioxanone.

6. The method of claim 4, wherein the alkyl group of the epoxy-based monomer in (a) is $C_{2-50}$ alkyl.

7. The method of claim 6, wherein the epoxy-based monomer is present in an amount of 0.1 mole % to 50 mole %, based on the alicyclic ester compound.

8. The method of claim 4, wherein the poly(ethylene glycol) of (b) is poly(ethylene glycol) acrylate or poly (ethylene glycol) methacrylate.

9. The method of claim 4, wherein the poly(ethylene glycol) has a molecular weight of from 150 to 1,500.

10. The method of claim 4, wherein the ring-opening polymerization of (a) is carried out in the presence of a catalyst.

11. The method of claim 10, wherein the catalyst is selected from $Sn(Oct)_2$, $Al(i-Bu)_3 \cdot 0.5H_2O$, $AlEt_3 \cdot 0.5H_2O$, and combinations thereof.

12. The method of claim 4, wherein the polymerizing in (b) is carried out by the addition of an initiator.

13. The method of claim 12, wherein the initiator is selected from the group consisting of azobisisobutyronitrile, benzoyl peroxide, acetyl peroxide, lauryl peroxide, tert-butyl peracetate, cumyl peroxide, tert-butyl peroxide, tert-butyl hydroperoxide, and combinations thereof.

* * * * *